Figure 1:
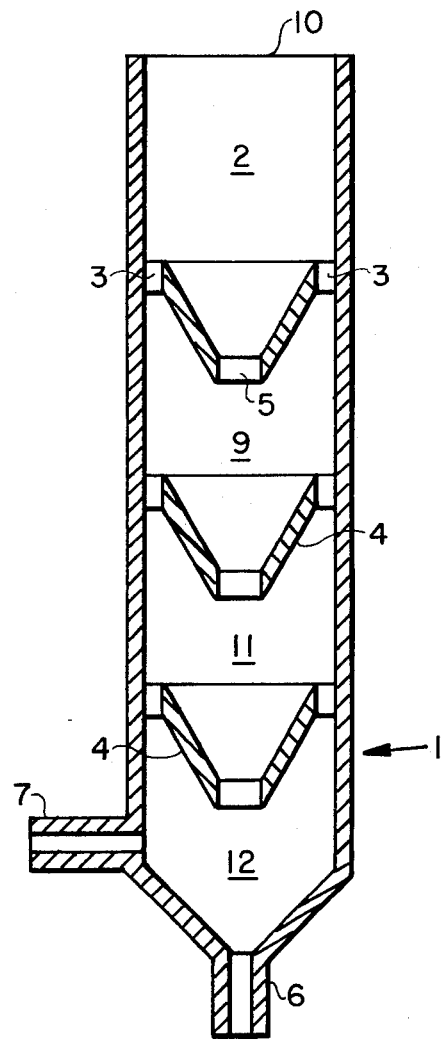

United States Patent [19]
Fuller

[11] 3,974,266
[45] Aug. 10, 1976

[54] PRODUCTION OF CHLORINE DIOXIDE

[75] Inventor: Willard A. Fuller, Grand Island, N.Y.

[73] Assignee: Hooker Chemicals & Plastics Corporation, Niagara Falls, N.Y.

[22] Filed: Oct. 7, 1975

[21] Appl. No.: 620,452

Related U.S. Application Data

[62] Division of Ser. No. 556,379, March 7, 1975.

[52] U.S. Cl. .............................. 423/478; 423/499; 423/500; 423/520
[51] Int. Cl.² .................. C01B 11/02; C01D 5/02; C01D 3/04; C01B 7/03
[58] Field of Search ............ 423/478, 499, 500, 520

[56] References Cited
UNITED STATES PATENTS

| | | |
|---|---|---|
| 2,531,137 | 11/1950 | Laubi et al. .................... 423/499 X |
| 3,563,702 | 2/1971 | Partridge et al. .................. 423/478 |
| 3,733,395 | 5/1973 | Fuller ................................ 423/478 |
| 3,754,081 | 8/1973 | Partridge et al. ............... 423/478 X |
| 3,760,065 | 9/1973 | Rapson ............................. 423/478 |
| 3,793,439 | 2/1974 | Rapson ............................. 423/478 |
| 3,800,026 | 3/1974 | Morgan ............................. 423/499 |
| 3,864,456 | 2/1975 | Winfield et al. .................... 423/478 |

*Primary Examiner*—Edward Stern
*Attorney, Agent, or Firm*—Peter F. Casella; William J. Crossetta, Jr.

[57] ABSTRACT

An improved process for the production of chlorine dioxide wherein an alkali metal chlorate and sulfuric acid are reacted in a single vessel, and the resultant alkali metal sulfate converted to alkali metal chloride in a metathesis column by reaction with hydrochloric acid.

5 Claims, 2 Drawing Figures

PRODUCTION OF CHLORINE DIOXIDE

This is a division of application Ser. No. 556,379, filed Mar. 7, 1975.

PRODUCTION OF CHLORINE DIOXIDE

This invention relates to chlorine dioxide production. More particularly, this invention relates to improvements in a method for treating sulfate-containing slurries emanating from single vessel process chlorine dioxide generators.

Inasmuch as chlorine dioxide is of considerable commercial interest and importance in the areas of pulp bleaching, water purification, fat bleaching, removal of phenols from industrial wastes, textile bleaching and the like, it is very desirable to provide processes by which the chlorine dioxide can be economically produced and by which the type of effluents produced thereby can be controlled.

One of the means of producing chlorine dioxide is by the reaction of alkali metal chlorate, alkali chloride and mineral acid such as sulfuric acid. Such reactions as occur are exemplified by the following:

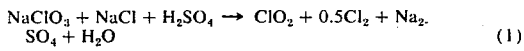
$$NaClO_3 + NaCl + H_2SO_4 \rightarrow ClO_2 + 0.5Cl_2 + Na_2SO_4 + H_2O \quad (1)$$

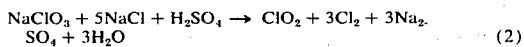
$$NaClO_3 + 5NaCl + H_2SO_4 \rightarrow ClO_2 + 3Cl_2 + 3Na_2SO_4 + 3H_2O \quad (2)$$

Such reactions are employed commercially, with the reactants continuously fed into a reaction vessel and the chlorine and chlorine dioxide produced therein continuously removed from from the reaction vessel.

Reaction 2, which is favored inasmuch as it produces primarily chlorine dioxide, results from the use of about equimolar amounts of chlorate and chloride.

A single vessel process for producing chlorine dioxide is set forth in U.S. Pat. No. 3,563,702, the teachings of which are hereby incorporated by reference, wherein alkali metal chlorate, an alkali metal chloride and a mineral acid solution are continuously fed to a single vessel generator-evaporator-crystallizer in proportions sufficient to generate chlorine dioxide and chlorine, at a temperature of from about 65° to about 85° centigrade, and an acidity of from about 2 to higher than about 4 normal, in the presence of a catalyst, or at 4–11 normal without catalyst, removing water by vacuum-induced evaporation at 100–400 millimeters of mercury absolute, with concurrent withdrawal of chlorine dioxide and chlorine, crystallizing the salt of the mineral acid within the generator and withdrawing the crystals from the vessel.

As reaction occurs within the generator, in reactions where sulfuric acid is employed as the mineral acid reactant, crystals of sodium sulfate and sodium acid sulfate in amounts and presence dependent generally upon the acid concentration used, are crystallized out and settle to the bottom of the generator from whence they are withdrawn in the form of a slurry. Generally when the single vessel process is carried out at an acidity of from about 4 to about 11, in the absence of a catalyst, alkali metal acid sulfates are produced.

In addition to the use of sulfuric acid, hydrochloric acid can also be used as the mineral acid reactant, in which instance the crystals removed from the generator are alkali metal chloride crystals. However, the hydrochloric acid process produces alkali metal chloride as a by-product, which product is often less desirable than alkali metal sulphate. Sodium sulphate is a valuable by-product, useful in kraft pulping operations, as is the chlorine dioxide. Therefore, systems producing chlorine dioxide and sodium sulfate are particularly useful inasmuch as on-site co-ordination can be effected with pulping operations, utilizing both the primary chlorine dioxide product and the recovered sodium sulfate in the pulping process, particularly in kraft mill operations.

In some instances, however, the requirement for sodium sulfate is greatly reduced or obviated. In certain types of pulping processes, sodium sulfate is not required. In certain kraft mill operations, the requirements for sodium sulfate may be reduced or varied, and the disposal of excess salt produces problems, in view of environmental protection standards presently in force. While the requirement for reduced quantities of sodium sulfate may vary, the requirement for the chlorine dioxide remains.

In such instances where reduced quantities or no sodium sulfate is required, the single vessel process can be converted to utilize hydrochloric acid as the mineral acid reactant, in which instance the by-product is sodium chloride. However, such systems are not as efficient as the systems employing sulfuric acid. Further, only sodium chloride is produced and in those instances where varying quantities of sodium sulfate are required, to generate the required amount of sodium sulfate would necessitate the switching back and forth from a catalyzed sulfuric acid system to a catalyzed hydrochloric acid system, with all the problems attendant thereto.

It is an object of the present invention to provide a process wherein the single vessel process may be operated most efficiently to produce chlorine dioxide and the recovery of by-product salt regulated to produce the salt desired in quantities desired, without the necessity of changing conditions in the reactor.

It is a further object of the present invention to provide an improved process for treatment of the crystal slurry produced in single vessel reactors to return chlorate and sulfate values contained in the solids containing effluent to the generator for further reaction and to convert the sulfate salt to chloride salt, as required.

In accordance with the process of the present invention, single vessel process slurry, containing alkali metal sulfate crystals and chlorate values, is introduced into the top of a metathesis column. Aqueous hydrochloric acid having a concentration of from about 32 to about 37 percent by weight and at a temperature above about 20° centigrade, preferably about 20° to about 35° centigrade is added continuously or intermittantly via an inlet near the bottom of the metathesis column in countercurrent flow to the downward flow of the slurry, with the crystals contained in the slurry reacting with hydrochloric acid to produce sodium chloride and sulfuric acid, the regenerated sulfuric acid and the chlorate values being washed up the column to the generator, and the sodium chloride removed as an aqueous slurry via an outlet located near the bottom of the metathesis column.

The use of such process has many advantages. The process permits of the employment of the more highly efficient sulfuric acid reaction in the single vessel generator-evaporator-crystallizer without changing to the less efficient hydrochloric acid reaction process, in those instances where reduced quantities of by-product sodium sulfate are required. In those instances where sodium sulfate is desired in increased or maximum quantities the process permits of such increase or maximizing by simply reducing or periodically replacing the flow of hydrochloric acid into the bottom of the metathesis column by a flow of wash water. In such instances where maximum production of sodium sulfate is to be realized, the upward flowing wash water functions to return essentially all chloride, chlorate and sulfuric acid values continuously to the generator, requiring a relatively low energy input into the system. Additionally, under these conditions, and where the generator is operated under high acid concentrations, on the order of about 10–11 normal, the water wash allows for the recovery of the sodium sulfate as neutral sodium sulfate as opposed to the undesirable acid sodium sulfates recovered by slurry filtration techniques employed in the past art.

The rates at which the hydrochloric acid or water are fed into the bottom of the metathesis column are, of course, dependent upon the desired conversion or washing to the effected. In those instances where total conversion of sodium sulfate to sodium chloride is to be effected, the amount of hydrochloric acid fed continuously into the metathesis column will be at least twice that of the sodium sulfate being produced in the reactor, on a molar basis. In those instances where the sodium sulfate to be removed is to be reduced by predetermined amounts, the flow adjustment of hydrochloric acid into the metathesis column is made to effectively permit of the desired amount of conversion, with the unconverted sodium sulfate recovered from the bottom of the column.

The rates of flow of the sodium sulfate slurry downward and the flow of hydrochloric acid upward are adjusted so as to provide maximum conversion efficiency without substantially increasing the steam requirements for the vacuum evaporation in the generator.

Generally, the washing and conversion reaction requires the adjustments of flow rates as to provide for a retention time of from about 10 to about 60 minutes, preferably from about 15 to about 40 minutes.

Figure 2:
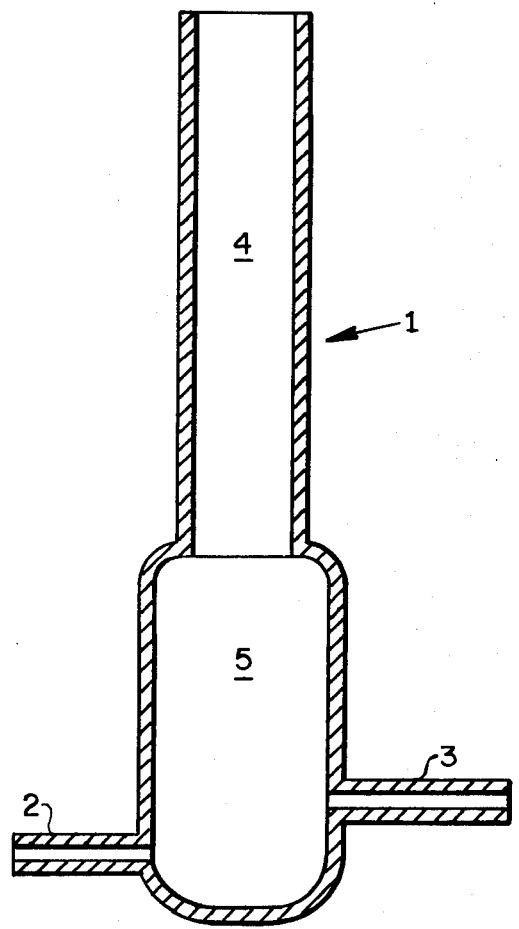

FIGS. 1 and 2 are illustrative of the metathesis columns which are advantageously employed in the present process. FIGS. 1 and 2 are schematic vertical elevations.

Referring now to FIG. 1, the apparatus embodies a metathesis column or tower 1, made of a corrosion-resistant material such as titanium, plastics, ceramics, glass or the like. The column is preferably, although not necessarily, substantially cylindrical, having an inlet means 10 at its upper end for the introduction of crystal slurry from the single vessel reactor (not shown). The lower end of the metathesis column is provided with a hydrochloric acid and/or hot water inlt 7 and means for varying the inflowing hydrochloric acid and hot water (not shown) and a crystal slurry take off or outlet, generally shown at 6. The column 1 is divided into multiple reaction/washing zones 9, 11, etc. by downwardly, inwardly tapering funnel-shaped ledges 4 having openings 5 at the apex for discharging crystal slurry downward into turbulent washing/reaction zones 9, 11, etc., the flow of crystal-containing slurry directed downward from ledge to ledge, and succeeding turbulent reaction/washing zones.

Each funnel-shaped ledge is provided with multiple apertures 3 located at or near the junction of the uppermost portion of the ledge and the column wall. As the crystal containing slurry moves downward onto the ledge and through the opening 5, the upcoming flow of hydrochloric acid is diverted in part through openings 3, creating turbulence in the zones immediately below the ledge openings, and continuously converting the sodium sulfate and returning sulfuric acid and chlorate values to the generator. Control of the downward flow of the crystals and the extent of the turbulence is conveniently effected by adjusting the relative sizes of the crystal outlet openings 5 and the openings 3.

Zone 12 of the column is a relatively quiescent or non-turbulent zone.

The metathesis column may be located immediately below the single vessel generator in which instance the crystal slurry moves by gravity flow from the generator 10 into the column and the chlorate and sulfuric acid values continuously returned directly to the generator by upward flow.

The total number of ledges situated in the metathesis column may be varied, depending generally upon the reaction efficiency and quantity of materials to be used. In use, employing commercially available single vessel generators, with a capacity of about 6000 gallons, metathesis columns of the type described having from about 0.5 to 1.0 ledge per linear foot of column have been found to be effective. Generally, columns of about 10–15 feet in length, having 8–10 ledges spaced approximately one foot apart are preferred.

In those instances where space and other factors dictate the placement of the metathesis column at a site adjacent the single vessel generator, crystal-containing slurry removed from the bottom of the generator is pumped to the top of the metathesis column by suitable pumping means (not shown) and the chlorate and sulfuric acid values returned from zone 12 of the metathesis column to the generator via suitable outlet and conveying means (not shown).

FIG. 2 represents another metathesis column which may be used in the process of the present invention. The metathesis column, as with the column of FIG. 1, may be situated either adjacent to or immediately below the single vessel generator. In those instances where the metathesis column is located immediately below the single vessel generator, crystal slurry is continuously moved from the bottom of the generator (not shown) to the top of column 1 at zone 1. Hydrochloric acid is continuously admitted to the column via 2 and flows upward through the column, reacting continuously with the sodium sulfate crystals, and continuously returning chlorate and sulfuric acid values removed therefrom to the generator from the top of the column. The sodium chloride moves downward into a collection zone 5 from whence they are removed via outlet 3. Outlet 3, shown as located at a point on the column 1 above the hydrochloric acid inlet 2 may be varied in position near the bottom of the column.

As with the metathesis column of FIG. 1, this metathesis column can also be situated adjacent the single vessel generator, in which instance pumping means are provided to continuously feed the crystal slurry from the generator to the metathesis column, and water containing chlorate and sulfuric acid values continuously removed from the top of the column and returned continuously to the generator via suitable pumping and inlet means.

The following example serves to illustrate the present invention.

EXAMPLE 1

Utilizing the metathesis column shown in FIG. 1 having 11 ledges, the dilute hydrochloric acid inlet was located between the fifth and sixth ledges from the bottom with a water inlet located at the bottom of the column. The reaction producing chlorine dioxide in the single vessel generator was adjusted to produce sodium sulfate at the rate of 57.6 pounds per hour. Aqueous hydrochloric acid, as 36 percent acid, was fed into metathesis column at the rate of 28 pounds per hour with 50 pounds per hour of hot water added to the bottom of the column to wash the sodium chloride produced in the metathesis column. Sulfuric acid, in the amount of 23.5 pounds per hour was recovered from the top of of the column. Analysis of the salt slurry recovered from the bottom of the column indicated 28.06 pounds per hour recovery of sodium chloride, 43.82 pounds per hour takeoff of water 0.08 pound per hour hydrochloric acid and 0.02 pounds per hour sodium sulfate, indicative of essentially complete conversion of the sodium sulfate to sodium chloride in the column.

What is claimed is:

1. In a process for continuously generating a mixture containing chlorine dioxide, chlorine and sulfate wherein
   a. an alkali metal chlorate, an alkali metal chloride and sulfuric acid are continuously reacted in a single vessel generator-evaporator-crystallizer in proportions to generate chlorine dioxide, chlorine and alkali metal sulfate, in the absence of a catalyst;
   b. the temperature is maintained at from about 65° to about 85° centigrade;
   c. the acidity of the reaction solution is maintained at from above 4 to about 11 normal;
   d. the reaction solution is subjected to a vacuum of from about 100 to about 400 millimeters of mercury absolute to effect evaporation of water vapor;
   e. chlorine dioxide and chlorine produced by said reaction is withdrawn in admixture with said water vapor; and
   f. alkali metal acid sulfate is continuously crystallized within said single vessel generator-evaporator-crystallizer and continuously withdrawn therefrom;

the improvement which comprises
   continuously passing the alkali metal acid sulfate crystals produced in said single vessel generator-evaporator-crystallizer in the form of a slurry into the top of a metathesis column, in a downward flow;
   countercurrently passing a stream of dilute hydrochloric acid upwardly through said column at a rate and in amounts sufficient to effect reaction with said alkali metal acid sulfate, converting said alkali metal acid sulfate to sulfuric acid and alkali metal chloride, continuously returning the sulfuric acid and chlorate values substantially completely to said single vessel generator-evaporator-crystallizer; and
   continuously removing alkali metal chloride slurry from the bottom of said metathesis column.

2. The process as defined by claim 1 wherein the alkali metal chlorate is sodium chlorate and the alkali metal chloride is sodium chloride.

3. The process as defined by claim 1 wherein the aqueous hydrochloric acid has a concentration of from about 32 to 37 percent by weight.

4. The process as defined by claim 1 wherein the temperatures of the aqueous hydrochloric acid is from about 20° to about 35° centigrade.

5. The process as defined by claim 1 wherein hot water is continuously introduced into said metathesis column at the bottom thereof to effect washing of the alkali metal chloride.

* * * * *

UNITED STATES PATENT OFFICE
CERTIFICATE OF CORRECTION

PATENT NO. : 3,974,266
DATED : August 10, 1976
INVENTOR(S) : Willard A. Fuller

It is certified that error appears in the above-identified patent and that said Letters Patent are hereby corrected as shown below:

Column 1, formula on lines 28-29 should read:

--- $NaClO_3 + 5NaCl + 3H_2SO_4 \longrightarrow 3Cl_2 + 3Na_2SO_4 + 3H_2O$ ---.

Column 1, line 35, "2" should be ---1---.

Signed and Sealed this

Fourteenth Day of June 1977

[SEAL]

Attest:

RUTH C. MASON
*Attesting Officer*

C. MARSHALL DANN
*Commissioner of Patents and Trademarks*